United States Patent Office 3,481,974
Patented Dec. 2, 1969

3,481,974
3-ALKOXY - 14-OXO-17β-OL-8,14-SECOESTRA-1,3,5(10),9(11) - TETRAENES AND ESTER DERIVATIVES
Stephen Kraychy and Robert B. Garland, Northbrook, and Seth S. Mizuba, Morton Grove, Ill., and William M. Scott, Parsippany, N.J., assignors to G. D. Searle & Co., Chicago, Ill., a corporation of Delaware
No Drawing. Filed May 19, 1967, Ser. No. 639,649
Int. Cl. C07c 69/12, 49/46
U.S. Cl. 260—488    3 Claims

ABSTRACT OF THE DISCLOSURE

Microbiological process for effecting a stereospecific selective reduction of one of the carbonyl groups of a 13 - alkyl - 3 - alkoxy-8,14-secogona-1,3,5(10),9(11)-tetraene-14,17-dione to afford the 17β-hydroxy isomer. Suitable microorganisms are members of the Humicola, Rhodotorula and Schizosaccharomyces genera.

The present invention is concerned with a microbiological process for effecting a stereospecific and selective reduction of steroid intermediates and, more particularly, the stereospecific and selective reduction of one of the carbonyl groups of a 13-alkyl-3-alkoxy-8,14-secogona-1,3,5(10),9(11)-tetraene-14,17-dione of the following structural formula

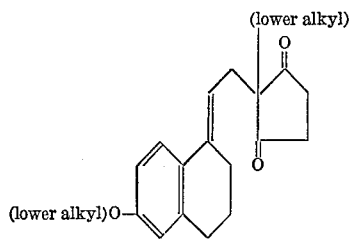

to afford the corresponding 17β-hydroxy isomer. Microorganisms suitable to afford that conversion are fungi of the Humicola genus and yeasts of the Rhodotorula and Schizosaccharomyces genera.

Microorganisms particularly preferred in the instant process are Humicola sp. A.T.C.C. 18100, Rhodotorula sp. A.T.C.C. 18101.

The instant process is of especical interest as a novel method for introducing asymmetric centers at the 13- and 17-positions of the involved substrates in order that the final product derived therefrom will possess the desired d-configuration of naturally occurring and synthetic steroids of pharmacological interest. Those substrates are obtained by means of the total synthesis procedures earlier described by Ananchenko et al., Tetrahedron Letters, 23, 1553 (1963). The naturally occurring steroids derived from the products of this invention are exemplified by d-estrone and d-estradiol, while the corresponding 18-alkylated compounds are examples of the desired synthetic products.

A specific example of the present process is the fermentation of 3 - methoxy-8,14-secoestra-1,3,5(10),9(11)-tetraene-14,17-dione by Rhodotorula sp. A.T.C.C. 18101 to produce 3-methoxy - 14 - oxo-8,14-secoestra-1,3,5-(10),9(11)-tetraen-17β-ol.

Substrates possessing a substituted-amino function at the 3-position, e.g. dialkylamino, morpholino, pyrollidino, piperidino, are similarly converted by the instant process. A preferred species is 3-morpholino-8,14-secoestra-1,3,5(10),9(11)-tetraene - 14,17 - dione. When Rhodotorula sp. A.T.C.C. 18101 is utilized as the microorganism, the corresponding 17β-hydroxy product results.

In the practice of this invention, the conversion may be effected in the growing culture of the microorganism either by adding the steroid to the culture during the incubation period or by including it in the nutrient prior to inoculation. Assimilable sources of carbon and nitrogen should be present in the culture medium. An adequate sterile air supply should be maintained during the conversion, for example, by the conventional techniques either of exposing a large surface of the medium to sterile air or by passing air through a submerged culture.

Sources of nitrogenous growth-promoting factors are those normally employed in such processes. They may be natural organic materials such as soybean meal, cottonseed protein concentrate, enzymatic casein digest, corn steep liquor, beef extracts, peptone and/or distiller's solubles, or synthetics such as nitrates and ammonium compounds.

Suitable energy source materials which may be utilized in the process of this invention include meat extracts, peptone, and the like, which serve also as nitrogen sources, or other conventional carbon-containing materials such as carbohydrates of the type exemplified by glycerol, glucose, fructose, dextrose, sucrose, lactose, maltose, dextrines, cerelose, starches and whey. These materials may be used either in purified states or as concentrates such as whey concentrate, corn steep liquor, grain mashes, and the like, or as mixtures of the above. The preferred but not limiting range of concentration of the steroid in the culture is about 0.01–1.0%. The time interval required for action of the enzyme system of the microorganisms employed may vary considerably, the range of about 1–12 days being practical but not limiting. The process of the present invention may be conducted at temperatures of 15–35°, the range of 20–30° being particularly preferred. It has been determined that the substrate can be added to the reaction mixture either in the solid form or dissolved in a suitable organic solvent such as acetone, methanol, or methyl Cellosolve. Alternatively, the substrate can be employed in the form of a finely divided solid. In such case the finely divided solid is added as an aqueous suspension containing a sufficient quantity of wetting agent suitable for dispersion. Typical of the wetting agents employed are polyoxyethylene sorbitan monoesters such as polyoxyethylene sorbitan mono-oleate. Alternate methods using ultrasonic energy together with organic solvents can be used to provide finely divided substrates.

The intermediates produced by the process of this invention are obtained as the d-isomers which correspond to the naturally occurring steroids, e.g. d-estradiol.

The invention will appear more fully from the examples which follow. These examples are given by way of illustration only and are not to be construed as limiting the invention either in spirit or in scope as many modifications both in materials and methods will be apparent to those skilled in the art. In these examples temperatures are given in degrees centigrade (° C.) and quantities of materials in parts by weight unless otherwise noted.

EXAMPLE 1

A stainless steel fermentation tank having a capacity of 50,000 parts is charged with a mixture of 1,000 parts of commercial grade dextrose, 150 parts of cottonseed protein concentrate, 90 parts by volume of corn steep liquor, 6 parts of concentrated hydrochloric acid, 5 parts of a silicone anti-foaming agent and 25,000 parts of tap water. The interior and contents of the tank are sterilized by the introduction of live steam under pressure to a final temperature of 120°. The final volume of the medium is about 30,000 parts. After cooling to room temperature, the medium is inoculated with an aqueous suspension of 7-day old spores and mycelium of Humicola sp. 18100 grown on carrot slices. This suspension is prepared by grinding the organism with 0.01% of a wetting agent. The contents of the tank are agitated by a stirrer operating at about 200 revolutions per minute and aeration is effected by introduction of filtered air at the rate of 10,000 parts per minute. Growth of the organism is allowed to continue for 24 hours.

At the end of that time a solution of 10 parts of 3-methoxy-8,14-secoestra - 1,3,5(10),9(11)-tetraene-14,17-dione in 200 parts of acetone is added. At the end of 41 hours of reaction time the contents of the tank are stirred with approximately 20,000 parts of methylene chloride for about 30 minutes. The resulting organic solution is concentrated to dryness under reduced pressure, and the resulting residue is decolorized by extraction into benzene followed by treatment with decolorizing carbon. Further purification is effected by adsorption on silica gel column and elution with 15–25% ethyl acetate in benzene solutions. The combined eluates are concentrated to dryness and the resulting fraction is added to a mixture of 10 parts of acetic anhydride and 20 parts of pyridine. That reaction solution is allowed to stand at room temperature for about 24 hours, at the end of which time it is diluted with water, then extracted with ether. That ether extract is washed successively with water, dilute hydrochloric acid, water, 10% aqueous sodium bicarbonate and water, then dried over anhydrous sodium sulfate and evaporated to dryness under reduced pressure. The residue containing 3-methoxy-14-oxo-8,14-secoestra-1,3,5(10),9(11)-tetraen-17β-ol 17-acetate is dissolved in 40 parts of methanol, and the resulting solution is decolorized with carbon, then combined with a solution of 6 parts of concentrated hydrochloric acid in 8 parts of methanol. The oily product which separates at the end of 30 minutes is purified by chromatography on silica gel followed by elution with 2% ethyl acetate in benzene. The fraction thus obtained is purified by recrystallization from methanol to yield 3-methoxyestra-1,3,5(10),8(9), 14-pentaen-17β-ol 17-acetate, melting at about 85–88°.

A mixture containing 2.1 parts of 3-methoxy-estra-1,3,5(10),8(9), 14-pentaen-17β-ol 17-acetate, 0.1 part of 5% palladium-on-carbon catalyst and 270 parts of ethanol is shaken with hydrogen at atmospheric pressure and room temperature until one molecular equivalent of hydrogen has been absorbed. The catalyst is removed by filtration and the filtrate is concentrated to dryness under nitrogen. Crystallization of the resulting residue from aqueous methanol affords 3-methoxyestra-1,3,5(10),8(9)-tetraen-17β-ol 17-acetate, melting at about 110–116°. The latter material is combined with a solution of 1 part of potassium hydroxide in 80 parts of methanol and that mixture is warmed for about 10 minutes, then diluted with water. The resulting crystals, obtained after cooling, are collected by filtration, washed with aqueous methanol and dried to yield estra-1,3,5(10),8(9)-tetraene-3,17β-diol 3-methyl ether, melting at about 124–128°. To a mixture of 10 parts of sodium with approximately 700 parts of liquid ammonia is added a solution of 0.96 part of estra-1,3,5(10),8(9)-tetraene-3,17β-diol 3-methyl ether in 225 parts of tetrahydrofuran containing 100 parts of aniline. The reaction mixture is stirred for about 45 minutes, at the end of which time 50 parts of solid ammonium chloride is added cautiously. The ammonia is allowed to evaporate under a stream of nitrogen. The residual mixture is concentrated to a small volume and approximately 1,000 parts of water is added. Acidification with hydrochloric acid followed by stirring at room temperature for about 30 minutes and cooling results in crystallization of the product, which is isolated by filtration and recrystallized from aqueous methanol containing decolorizing carbon to afford material melting about 96–99°. Pure estra-1,3,5(10)-triene-3,17β-diol 3-methyl ether, melting at about 118–120°, is obtained by further recrystallization from hexane.

EXAMPLE 2

A stainless steel fermentation tank having a capacity of 50,000 parts is charged with a mixture of 320 parts of an enzymatic case in digest, 400 parts of cerelose and 5 parts of silicone anti-foaming agent and 25,000 parts of tap water. The interior and contents of the tank are sterilized by the introduction of live steam under pressure to a final temperature of 120°. The final volume of the medium is about 40,000 parts. After cooling to room temperature, the medium is inoculated with an aqueous suspension of Rhodotorula sp. A.T.C.C. 18101. The contents of the tank are agitated by a stirrer operating at about 200 revolutions per minute and aeration is effected by introduction of filtered air at the rate of 10,000 parts per minute. Growth of the organism is allowed to continue for about 18 hours at the end of which time a solution of 5 parts of 3-methoxy-8,14-secoestra-1,3,5(10), 9(11)-tetraene-14,17-dione in 1600 parts of methanol is added. The mixture is allowed to ferment for approximately 55 hours, then is extracted with methylene chloride. The resulting organic solution is concentrated to dryness under reduced pressure, and the resulting residue is dissolved in benzene, then adsorbed on a silica gel chromatographic column. Elution with 20–30% ethyl acetate in benzene solutions affords a fraction which is purified by recrystallization from acetone-hexane to yield 3-methoxy-14-oxo-8,14-secoestra - 1,3,5(10),9(11) - tetraen-17β-ol melting at about 109.5–113° and exhibiting an optical rotation, in methanol, of —16°. It is represented by the following structural formula

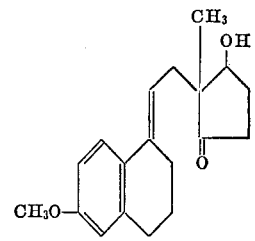

EXAMPLE 3

When an equivalent quantity of 3-ethoxy-8,14-secoestra-1,3,5(10),9(11)-tetraene-14,17-dione is substituted in the procedure of Example 2, there is produced 3-ethoxy-14-oxo-8,14-secoestra-1,3,5(10),9(11)-tetraen-17β-ol.

EXAMPLE 4

The substitution of an equivalent quantity of propionic anhydride for acetic anhydride in the procedure of Example 1 results in 3-methoxy-14-oxo-8,14-secoestra-1,3,5 (10),9(11)-tetraen-17β-ol 17-propionate.

What is claimed is:
1. A compound of the formula

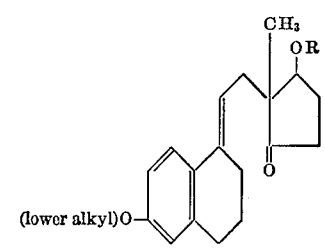

wherein R is a member of the class consisting of hydrogen and a lower alkanoyl radical.
2. As in claim 1, the compound which is 3-methoxy-14-oxo-8,14-secoestra-1,3,5(10),9(11)-tetraen-17β-ol.

3. As in claim 1, the compound which is 3-methoxy-14-oxo-8,14-secoestra-1,3,5(10),9(11)-tetraen - 17β - ol 17-acetate.

References Cited

Gibian et al., Tetrahedron Letters, 21,2321–2330, 1966.
Kosmol et al. Ann. Chem., 701, 199–205, February 1967.
Rufer et al., Ann. Chem. 701, 206–216, February 1967.

LORRAINE A. WEINBERGER, Primary Examiner

V. GARNER, Assistant Examiner

U.S. Cl. X.R.

195—51; 260—247.7, 294.7, 326.8, 397.5, 571, 576, 590, 999